United States Patent
Yaser et al.

(10) Patent No.: US 11,474,425 B2
(45) Date of Patent: Oct. 18, 2022

(54) DRIVING MULTIPLE RESONANCE MEMS MIRRORS WITH A SINGLE FREQUENCY

(71) Applicant: STMicroelectronics LTD, Netanya (IL)

(72) Inventors: Eli Yaser, Tel Aviv (IL); Guy Amor, Gan-Yavne (IL); Yotam Nachmias, Tel Aviv (IL); Dadi Sharon, Givat Ada (IL); Sivan Nagola, Tel Aviv (IL)

(73) Assignee: STMicroelectronics LTD, Netanya (IL)

( * ) Notice: Subject to any disclaimer, the term of this patent is extended or adjusted under 35 U.S.C. 154(b) by 479 days.

(21) Appl. No.: 16/540,557

(22) Filed: Aug. 14, 2019

(65) Prior Publication Data

US 2021/0048737 A1     Feb. 18, 2021

(51) Int. Cl.
*G03B 21/28* (2006.01)
*G02B 26/08* (2006.01)
(Continued)

(52) U.S. Cl.
CPC ......... *G03B 21/28* (2013.01); *G02B 26/0833* (2013.01); *G02B 26/10* (2013.01); *G03B 21/2033* (2013.01)

(58) Field of Classification Search
CPC ...... G02B 6/0035; G02B 6/06; G02B 6/1225; G02B 6/13; G02B 6/2713; G02B 6/2817;
(Continued)

(56) References Cited

U.S. PATENT DOCUMENTS

2006/0109335 A1   5/2006  Turner et al.
2009/0141192 A1   6/2009  Nojima
(Continued)

FOREIGN PATENT DOCUMENTS

EP   1589364 A2   10/2005
EP   1589365 A2   10/2005
(Continued)

OTHER PUBLICATIONS

Sandner, Th., et al: "Quasi-static Microscanner with Linearized Scanning for an Adaptive 3D-Lasercamera," AMA Conferences 2013, Sensor 2013, OPTO 2013, IRS(2) 2013, pp. 28-33.
(Continued)

*Primary Examiner* — Collin X Beatty
*Assistant Examiner* — Grant A Gagnon
(74) *Attorney, Agent, or Firm* — Crowe & Dunlevy

(57) ABSTRACT

A control circuit includes a first control circuit generating a first drive control signal from a pre-drive signal (that is a frequency at which an opening angle of the first and second mirrors is equal) for the first mirror. A second control circuit generates a second drive control signal from the pre-drive signal for the second mirror. First and second drivers generate first and second drive signals for the first and second mirrors from the first and second drive control signals. The first and second drive control signals are generated so that the first and second drive signals each have a same frequency as the pre-drive signal but are different in amplitude from one another to cause the first and second mirrors to move at a same frequency, with a same and substantially constant given opening angle as one another, and in phase with one another.

24 Claims, 5 Drawing Sheets

(51) Int. Cl.
*G02B 26/10* (2006.01)
*G03B 21/20* (2006.01)

(58) Field of Classification Search
CPC .... G02B 6/29385; G02B 6/351; G02B 6/362; G02B 6/3821; G02B 6/4215; G02B 6/4225; G02B 6/4232; G02B 6/4245; G02B 6/4251; G02B 6/4259; G02B 6/426; G02B 6/428; G02B 7/00; G02B 7/10; G02B 7/28; G02B 1/02; G02B 1/06; G02B 1/11; G02B 1/111; G02B 13/001; G02B 13/0045; G02B 13/0055; G02B 13/006; G02B 13/0065; G02B 13/007; G02B 13/0075; G02B 13/009; G02B 13/02; G02B 13/08; G02B 13/143; G02B 17/00; G02B 17/002; G02B 17/023; G02B 17/04; G02B 17/0808; G02B 17/0812; G02B 17/0852; G02B 17/0084; G02B 17/0892; G02B 19/0028; G02B 19/0033; G02B 19/0066; G02B 2027/0112; G02B 2027/012; G02B 2027/0136; G02B 2027/0154; G02B 2027/0169; G02B 21/0024; G02B 21/0044; G02B 21/0052; G02B 21/0084; G02B 21/025; G02B 21/24; G02B 21/241; G02B 21/248; G02B 21/26; G02B 21/36; G02B 23/02; G02B 23/04; G02B 23/12; G02B 23/14; G02B 23/16; G02B 23/24; G02B 23/2469; G02B 26/002; G02B 26/0891; G02B 26/124; G02B 26/18; G02B 27/0006; G02B 27/0081; G02B 27/0093; G02B 27/0149; G02B 27/0905; G02B 27/0927; G02B 27/0933; G02B 27/0944; G02B 27/0977; G02B 27/1013; G02B 27/102; G02B 27/1073; G02B 27/1093; G02B 27/28; G02B 27/281; G02B 27/285; G02B 27/40; G02B 27/4205; G02B 27/4222; G02B 27/4227; G02B 27/4238; G02B 27/52; G02B 27/58; G02B 27/644; G02B 3/0037; G02B 3/005; G02B 3/0068; G02B 3/0087; G02B 3/08; G02B 30/25; G02B 30/27; G02B 30/40; G02B 30/56; G02B 5/003; G02B 5/06; G02B 5/085; G02B 5/1809; G02B 5/1871; G02B 5/1876; G02B 5/20; G02B 5/203; G02B 5/281; G02B 5/288; G02B 5/3016; G02B 5/3083; G02B 6/00; G02B 6/0001; G02B 6/0006; G02B 6/0036; G02B 6/0038; G02B 6/0055; G02B 6/02; G02B 6/08; G02B 6/12011; G02B 6/12019; G02B 6/12021; G02B 6/1203; G02B 6/1226; G02B 6/14; G02B 6/264; G02B 6/2766; G02B 6/278; G02B 6/2813; G02B 6/2826; G02B 6/2861; G02B 6/29328; G02B 6/29349; G02B 6/29367; G02B 6/2937; G02B 6/29373; G02B 6/29397; G02B 6/30; G02B 6/3508; G02B 6/3538; G02B 6/3608; G02B 6/3636; G02B 6/3652; G02B 6/3656; G02B 6/3833; G02B 6/3849; G02B 6/3885; G02B 6/3891; G02B 6/4201; G02B 6/4206; G02B 6/4209; G02B 6/4216; G02B 6/4234; G02B 6/4244; G02B 6/425; G02B 6/4274; G02B 6/4279; G02B 6/4286; G02B 6/4405; G02B 6/4411; G02B 6/4416; G02B 6/4459; G02B 7/004; G02B 7/025; G02B 7/026; G02B 7/028; G02B 7/04; G02B 7/16; G02B 7/198; G02B 7/20; G02B 7/287; G02B 7/32; G02B 7/36

See application file for complete search history.

(56) References Cited

U.S. PATENT DOCUMENTS

| | | |
|---|---|---|
| 2009/0231721 A1 | 9/2009 | Kajita et al. |
| 2010/0303407 A1 | 12/2010 | Sakai |
| 2016/0344156 A1* | 11/2016 | Rothberg .............. H01S 3/1305 |
| 2018/0106903 A1 | 4/2018 | Iida et al. |
| 2018/0321483 A1 | 11/2018 | Haran |

FOREIGN PATENT DOCUMENTS

| | | |
|---|---|---|
| JP | 2005305770 A | 11/2005 |
| JP | 2014013314 A | 1/2014 |
| KR | 20100078688 A | 7/2010 |

OTHER PUBLICATIONS

Reittererr, J., et al: "Laser Light Module with Integrated MEMS Mirror for Autostereoscopic Outdoor Displays," ScienceDirect, Procedia Engineering 87 (2014) pp. 1541-1544.

EP Search Report and Written Opinion for co-pending EP Appl. No. 20188304.8 dated Jan. 11, 2021 (10 pages).

First Office Action and Search Report for family-related CN Appl. No 202010814761.6, report dated May 31, 2022, 12 pgs.

First Office Action from family-related EP Appl. 20188304.8, report dated Aug. 12, 2022, 6 pgs.

* cited by examiner

DRIVING MULTIPLE RESONANCE MEMS MIRRORS WITH A SINGLE FREQUENCY

TECHNICAL FIELD

This application is related to the field of laser projection systems, and in particular, to control circuits and techniques for driving two or more movable resonant mirrors at a same frequency.

BACKGROUND

Certain laser scanning projection devices such as projectors and the like often employ a collimated laser beam that scans across a flat or curved surface in a straight line path. These devices employ projection systems incorporating tilting mirrors to deflect the collimated laser beam to perform the scanning. These tilting mirrors may be, or may include, Micro Electro Mechanical Systems ("MEMS") devices. The actuation of mirrors used in MEMS devices, referred to herein as MEMS mirrors, can be via the electromagnetic, electrostatic, piezoelectric, and thermoelectric effects, depending on application.

One type of common resonant MEMS mirror includes a stator and a rotor, with the rotor or structures carried by the rotor being reflective. The stator and/or rotor are driven with a drive signal which results in the rotor oscillating at resonance with respect to the stator, thereby changing the angle of reflectance of an incident light beam on the rotor. By oscillating the rotor between two orientations at resonance, an opening angle of the mirror is defined, and scanning of the light beam across the flat surface is accomplished.

A particularly challenging application for projectors exists in their incorporation into virtual reality or augmented reality headsets, as such applications typically involve the use of a separate projection system for each eye. The use of a separate projection system for each eye means that it is desired for such projection systems to move their laser beams at a same frequency so as to reduce visual strain on a user, while maintaining the same opening angle as one another to produce equally sized images. Prior art systems seek to address this concern by simply driving the MEMS mirrors of two projection systems with a same drive signal as can be seen in FIGS. 1A-1B (here, a 400 Hz drive signal drives two mirrors). However, as can also be seen in FIGS. 1A-1B, this will not result in the MEMS mirrors having the same opening angle due to manufacturing variations in the MEMS mirrors—mirror #1 has a resonance frequency of 390 Hz, while mirror #2 has a resonance frequency of 410 Hz, with the result being that the phases of mirror #1 and mirror #2 are not aligned. In addition to this phase misalignment, the opening angles of the mirrors may be unequal when driven with a same drive signal.

Since movement of the MEMS mirrors of the separate projection systems within such a headset at a same frequency, in phase, and at a same opening angle is most desirable, further development into this area is therefore needed.

SUMMARY

Disclosed herein is a projector including a first microelectromechanical (MEMS) mirror, a second MEMS mirror, and a mirror pre-driver configured to generate a pre-drive signal. The pre-drive signal has a frequency that is a frequency at which an opening angle of the first MEMS mirror is equal to an opening angle of the second MEMS mirror, with the frequency of the pre-drive signal being neither a resonance frequency of the first MEMS mirror nor a resonance frequency of the second MEMS mirror. A first mirror control circuit is configured to generate a first drive control signal from the pre-drive signal for the first MEMS mirror. A first mirror driver is configured to generate a first drive signal for the first MEMS mirror from the first drive control signal. A second mirror control circuit is configured to generate a second drive control signal from the pre-drive signal for the second MEMS mirror. A second mirror driver is configured to generate a second drive signal for the second MEMS mirror from the second drive control signal. The first and second drive control signals are generated by the first and second mirror control circuits so that the first and second drive signals each have a same frequency as the pre-drive signal but each have a different amplitude and phase from one another so as to cause the first and second MEMS mirrors to move at a same frequency, with a same and substantially constant given opening angle, and in phase with one another.

The frequency at which the opening angle of the first MEMS mirror may be equal to the opening angle of the second MEMS mirror is an average of a resonance frequency of the first MEMS mirror and a resonance frequency of the second MEMS mirror.

The first and second mirror control circuits may generate the first and second drive control signals so that the first and second drive signals are different in amplitude and phase from one another.

A red-green-blue (RGB) laser source may be configured to project RGB laser beams that impinge upon the first and second MEMS mirrors. A VR headset housing has the RGB laser source, the first and second MEMS mirrors, mirror pre-driver, first and second mirror control circuits, and first and second mirror drivers therein.

A first mirror position sensor may be associated with the first MEMS mirror and a second mirror position sensor may be associated with the second MEMS mirror. A first zero cross detector may be associated with the first MEMS mirror and a second zero cross detector may be associated with the second MEMS mirror. The first and second mirror position sensors may be configured to generate first and second mirror sense signals indicating peak opening angles of the first and second MEMS mirrors. The first mirror control circuit may generate the first drive control signal as a function of the pre-drive signal, the first mirror sense signal, and detected zero crosses of a first mirror sense signal generated by the first MEMS mirror in response to the first drive signal. The second mirror control circuit may generate the second drive control signal as a function of the pre-drive signal, the second mirror sense signal, and detected zero crosses of a second mirror sense signal generated by the second MEMS mirror in response to the second drive signal.

Also disclosed herein is a projector including a first microelectromechanical (MEMS) mirror, a second MEMS mirror, and a mirror pre-driver configured to generate a pre-drive signal. The pre-drive signal has a frequency that is a frequency at which an opening angle of the first MEMS mirror is equal to an opening angle of the second MEMS mirror, with the frequency of the pre-drive signal being neither a resonance frequency of the first MEMS mirror nor a resonance frequency of the second MEMS mirror. A first mirror control circuit is configured to generate a first drive control signal from the pre-drive signal for the first MEMS mirror. A first mirror driver is configured to generate a first drive signal for the first MEMS mirror from the first drive control signal. A second mirror control circuit is configured to generate a second drive control signal from the pre-drive signal for the second MEMS mirror. A second mirror driver is configured to generate a second drive signal for the second MEMS mirror from the second drive control signal. The first and second drive control signals are generated by the first and second mirror control circuits so as to cause the first and second MEMS mirrors to move at a same frequency, with a same and substantially constant given opening angle.

The frequency at which the opening angle of the first MEMS mirror is equal to the opening angle of the second MEMS mirror may be an average of a resonance frequency of the first MEMS mirror and a resonance frequency of the second MEMS mirror.

The first and second mirror control circuits may generate the first and second drive control signals so that the first and second drive signals are different in amplitude from one another.

A red-green-blue (RGB) laser source may be configured to project RGB laser beams that impinge upon the first and second MEMS mirrors. A VR headset may include a housing having the RGB laser source, the first and second MEMS mirrors, mirror pre-driver, first and second mirror control circuits, and first and second mirror drivers therein.

A first mirror position sensor may be associated with the first MEMS mirror and a second mirror position sensor may be associated with the second MEMS mirror. The first and second mirror position sensors may be configured to generate first and second mirror sense signals indicating peak opening angles of the first and second MEMS mirrors. The first mirror control circuit may generate the first drive control signal as a function of the pre-drive signal and the first mirror sense signal. The second mirror control circuit may generate the second drive control signal as a function of the pre-drive signal and the second mirror sense signal.

Also disclosed herein is a control circuit for driving first and second movable mirrors. The control circuit includes a mirror pre-driver configured to generate a pre-drive signal, the pre-drive signal having a frequency that is that is a frequency at which an opening angle of the first movable mirror is equal to an opening angle of the second movable mirror. A first mirror control circuit is configured to generate a first drive control signal from the pre-drive signal for the first movable mirror in response to an operating characteristic of the first movable mirror. A first mirror driver is configured to generate a first drive signal for the first movable mirror from the first drive control signal. A second mirror control circuit is configured to generate a second drive control signal from the pre-drive signal for the second movable mirror in response to an operating characteristic of the second movable mirror. A second mirror driver is configured to generate a second drive signal for the second movable mirror from the second drive control signal. The first and second drive control signals are generated by the first and second mirror control circuits so that the first and second drive signals each have a same frequency as the pre-drive signal but are different in amplitude from one another so as to cause the first and second movable mirrors to move at a same frequency, with a same and substantially constant given opening angle as one another.

The frequency at which the opening angle of the first movable mirror is equal to the opening angle of the second movable mirror may be an average of a resonance frequency of the first movable mirror and a resonance frequency of the second movable mirror.

The operating characteristic of the first movable mirror may be zero crosses of a first mirror sense signal generated by the first movable mirror in response to the first drive signal. The operating characteristic of the second movable mirror may be zero crosses of a second mirror sense signal generated by the second movable mirror in response to the second drive signal. The first and second drive control signals may be generated by the first and second mirror control circuits so that the first and second drive signals are different in phase from one another so as to cause the first and second movable mirrors to move in phase with one another.

The operating characteristic of the first movable mirror may be a maximum opening angle reached by the first movable mirror. The operating characteristic of the second movable mirror may be a maximum opening angle reached by the second movable mirror. The first and second drive control signals may be generated by the first and second mirror control circuits so that the first and second drive signals are different in amplitude from one another so as to cause the first and second movable mirrors to move with a same and substantially constant given opening angle as one another.

Also disclosed herein is a method of driving first and second movable mirrors. The method includes generating a pre-drive signal having a frequency that is a frequency at which an opening angle of the first movable mirror is equal to an opening angle of the second movable mirror, generating a first drive control signal from the pre-drive signal for the first movable mirror in response to an operating characteristic of the first movable mirror, generating a first drive signal for the first movable mirror from the first drive control signal, generating a second drive control signal from the pre-drive signal for the second movable mirror in response to an operating characteristic of the second movable mirror, and generating a second drive signal for the second movable mirror from the second drive control signal. The first and second drive signals are generated so as to cause the first and second movable mirrors to move at a same frequency, and with a same and substantially constant given opening angle as one another.

The frequency at which the opening angle of the first movable mirror is equal to the opening angle of the second movable mirror may be an average of a resonance frequency of the first movable mirror and a resonance frequency of the second movable mirror.

The first and second drive signals may be generated to each have a same frequency as the pre-drive signal but be different in amplitude from one another.

The first and second drive signals may be generated to each have a same frequency as the pre-drive signal but be different in amplitude and phase from one another.

Prior to generating the pre-drive signal, the method may include performing a frequency sweep on a drive signal applied to the first movable mirror while monitoring opening angle of the first movable mirror, and determining a resonance frequency of the first movable mirror to be a frequency of the frequency sweep at which the opening angle of the first movable mirror is at a maximum. Prior to generating the pre-drive signal, the method may also include performing a frequency sweep on a drive signal applied to the second movable mirror while monitoring opening angle of the second movable mirror, and determining a resonance frequency of the second movable mirror to be a frequency of the frequency sweep at which the opening angle of the second movable mirror is at a maximum, and calculating an average of the resonance frequency of the first movable mirror and a resonance frequency of the second movable mirror.

The method may include generating RGB lasers and directing the RGB lasers to impinge upon the first and second movable mirrors.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

It should be understood that in the descriptions below, any references to "laser", "laser beam", "RGB laser beam", "RGB beam", "collimated light", "collimated light beam" or "light" are intended to include any wavelength of light, or a combination of different wavelengths of light. For example, a "laser" referred to below may be a single color laser, or may be a unified laser beam of multiple colors of visible light, such as a red-green-blue (RGB) laser beam. Therefore, a "light source", "laser source", or other piece of hardware referred to below is to be understood to be capable of producing any form of light as described above. As such, it is to be understood that the terms described above are not intended to be limiting, but are simply used for brevity and for sake of examples of possible embodiments from among many possible embodiments.

Figure 1A:
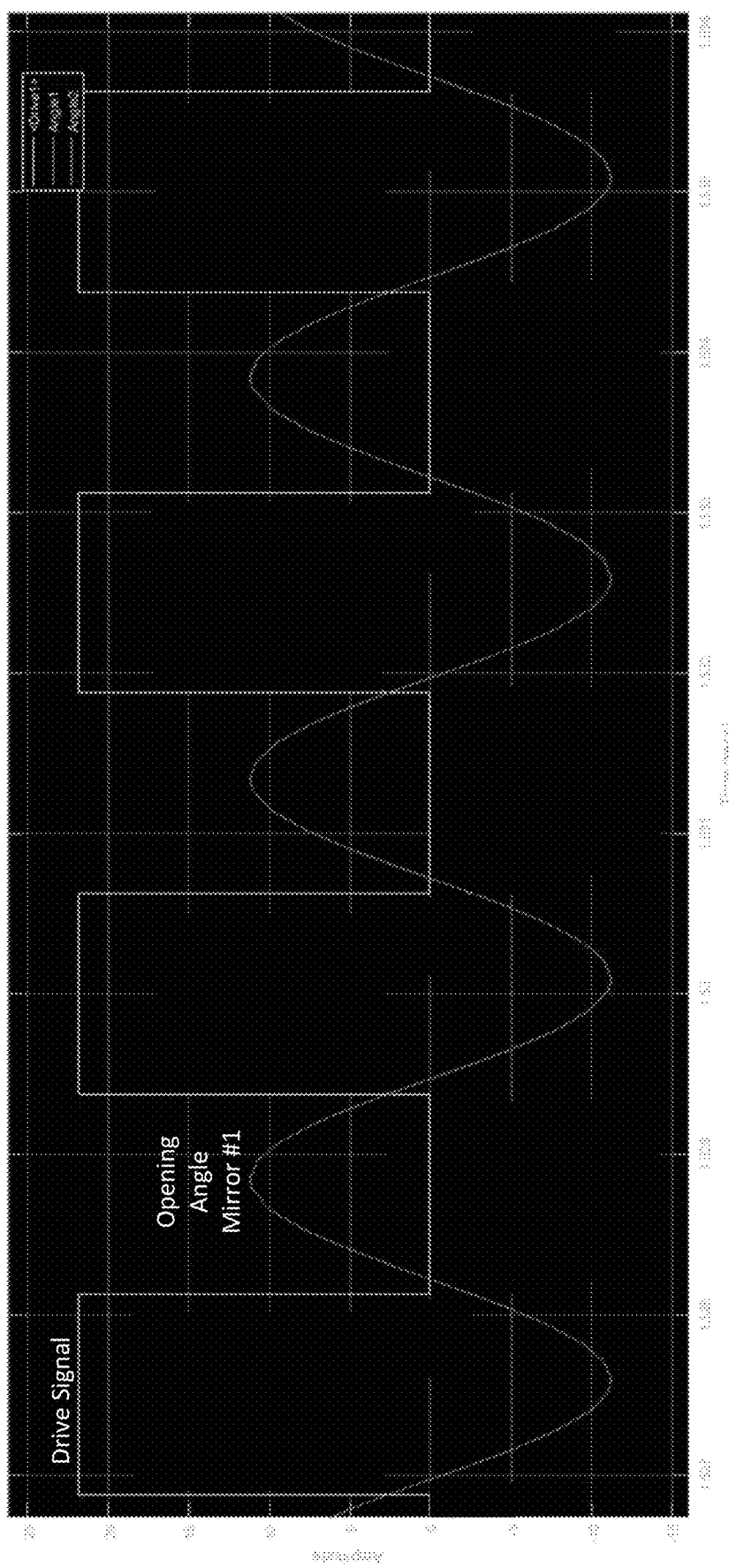
FIGS. 1A-1B are graphs showing that in prior art systems that drive two mirrors at a frequency that is the average of the resonance frequency of both mirrors, the opening angles of the mirrors are out of phase with one another.
Figure 1B:
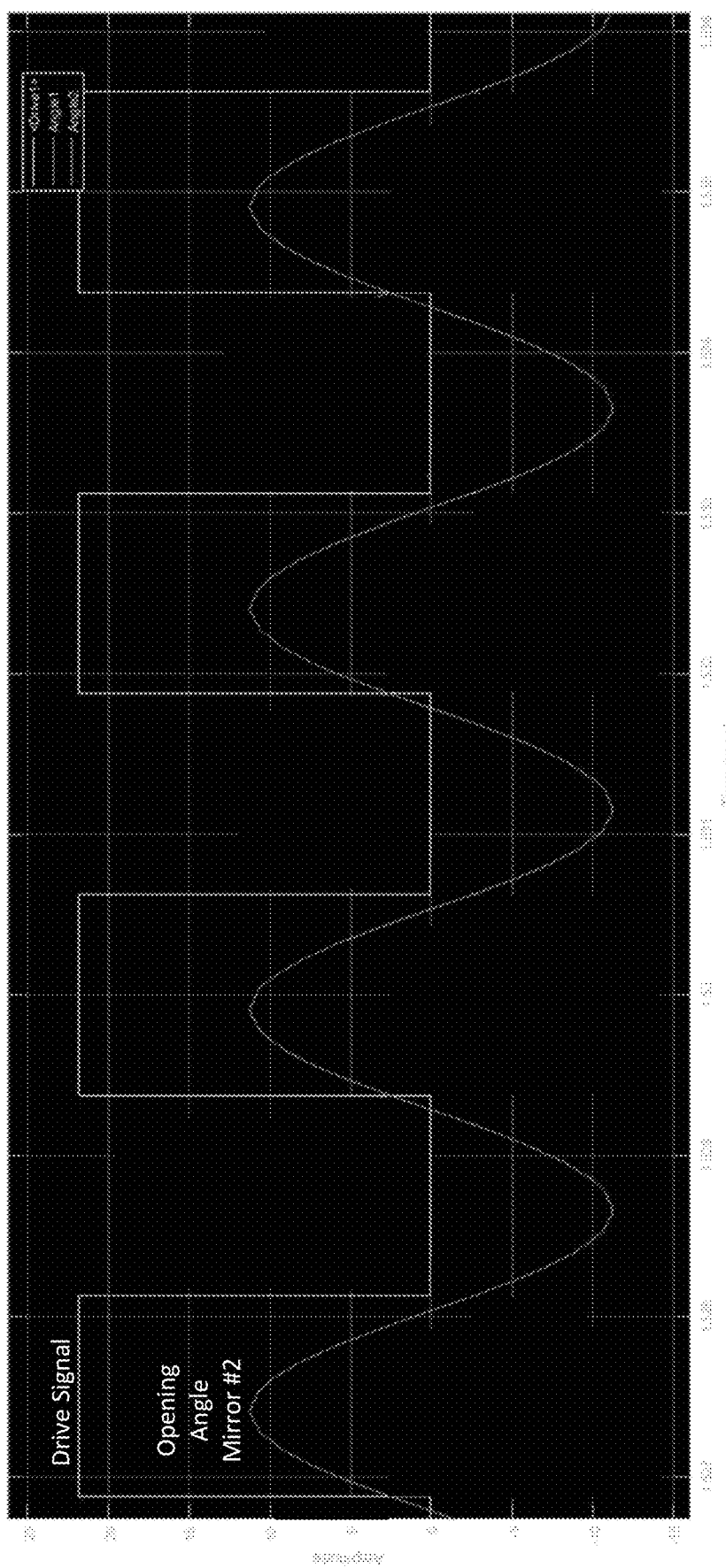
Figure 2:
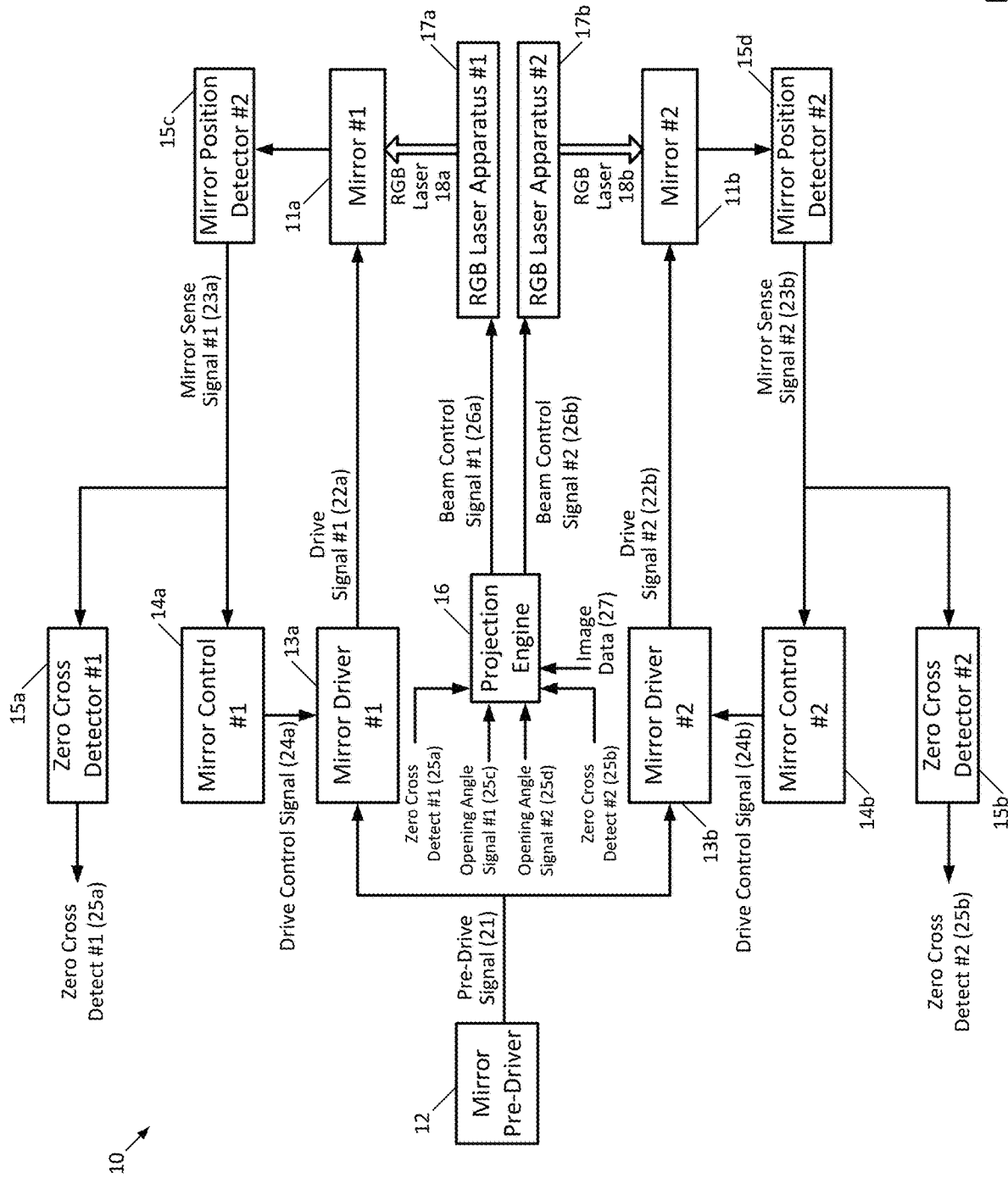
FIG. 2 is a block diagram of a first dual-projection system in accordance with this disclosure in which there are two mirrors operated at a same frequency.

Now described with reference to FIG. 2 is a dual-projection system 10 for projecting the movement of two red green blue (RGB) laser beams across a target or targets at a rate and resolution sufficient so as to form images visible by the human eye. In particular, two images are formed, one for each eye. The dual-projection system 10 may be incorporated within virtual reality or augmented reality headsets of any sort, including but not limited to goggles, visors, and glasses.

The dual-projection system 10 includes first and second microelectromechanical (MEMS) mirrors 11a, 11b that are formed, sized, and dimensioned as typical MEMS mirrors produced by STMicroelectronics, although it is to be understood that other MEMS mirrors may be used. The MEMS mirrors 11a, 11b may be uniaxial or biaxial resonance mirrors A projection engine 16 receives image data 27 from an external source, processes the image data, and then generates first and second beam control signals 26a, 26b respectively for the first and second RGB laser apparatuses 17a, 17b to cause the first and second RGB laser apparatuses 17a, 17b to produce first and second RGB lasers 18a, 18b that are directed toward and impinge upon the MEMS mirrors 11a, 11b. In particular, the beam control signals 26a, 26b serve to cause the laser apparatuses 17a, 17b to appropriately generate and modulate the intensity of RGB lasers 18a, 18b so that when the RGB lasers 18a, 18b are reflected by the MEMS mirrors 11a, 11b across display area targets in a suitable pattern, the images contained within the image data 27 are reproduced in a format visible to the human eye. The aforementioned display area targets may have flat or curved surfaces.

The driving of the movement of the MEMS mirrors 11a, 11b is now described. A mirror pre-driver 12 generates a pre-drive signal 21 that has a frequency equal that is a frequency at which an opening angle of the first and second mirrors is equal (which, in some instances, may be an average of the resonance frequencies of the MEMS mirrors 11a, 11b that is, the frequency of the pre-drive signal 21 may be equal to 0.5*(Resonance Frequency of MEMS Mirror 11a+Resonance Frequency of MEMS mirror 11b)—or may be the meeting point of the gain transfer function of the MEMS mirror 11a and MEMS mirror 11b, or other suitable frequency). The goal of the frequency for the pre-drive signal 21 is that produced drive signals 22a, 22b for the MEMS mirrors 11a, 11b have enough drive energy to open both the MEMS mirrors 11a, 11b to a same desired opening angle.

The frequency of the pre-drive signal 21 matches neither the resonance frequency of MEMS mirror 11a nor the resonance frequency of MEMS mirror 11b, since these resonance frequencies will not be equal due to manufacturing variation. The mirror drivers 13a, 13b each receive the pre-drive signal 21 and generate from it respective drive signals 22a, 22b for the MEMS mirrors 11a, 11b. Note that these drive signals 22a, 22b may take any periodic shape (e.g., square wave, pulsed signal, sine wave, cosine wave, etc) and both have the same frequency of that of the pre-drive signal 21 and therefore the same frequency as one another. As will be explained, however, on the basis of feedback, the mirror controllers 14a, 14b will adjust the amplitudes of the drive signals 22a, 22b through issuing suitable instructions to the mirror drivers 13a, 13b in the form of drive control signals 24a, 24b.

In response to the drive signals 22a, 22b applied to the MEMS mirrors 11a, 11b, the MEMS mirrors 11a, 11b produce mirror sense signals 23a, 23b.

Mirror position sensors 15c, 15d (which may be, for example, piezoresistive sensors) are respectively associated with the MEMS mirrors 11a, 11b and generate mirror sense signals 23a, 23b indicating the current opening angles of the MEMS mirrors 11a, 11b. From the mirror sense signals 23a, 23b, the mirror controllers 14a, 14b determine the peak opening angles of the MEMS mirrors 11a, 11b, and then modify the drive control signals 24a, 24b to the mirror drivers 13a, 13b in such a fashion so as to cause the MEMS mirrors 11a, 11b to operate with a same peak opening angle.

Therefore, overall, the mirror controllers 14a, 14b generate drive control signals 24a, 24b for the mirror drivers 13a, 13b that cause the mirror drivers 13a, 13b to adjust the amplitudes of the drive signals 22a, 22b separately from one another, with the aim of ensuring that the MEMS mirrors 11a, 11b maintain constant and equal opening angles. Note that the drive control signals 24a, 24b do not cause the mirror drivers 13a, 13b to adjust the frequency of the drive signals 22a, 22b, and that the frequency of the drive signals 22a, 22b remains equal to that of the pre-drive signal 21. Also note that the result of this adjustment may be that the drive signals 22a, 22b have different amplitudes so as to produce a same maximum opening angle of the MEMS mirrors 11a, 11b. The end result is that the MEMS mirrors 11a, 11b move or oscillate at the same frequency and each maintain a constant opening angle, with the opening angles of the MEMS mirrors 11a, 11b being equal to one another.

Zero cross detectors 15a, 15b respectively receive the mirror sense signals 23a, 23b and detect zero crosses of the mirror sense signals 23a, 23b, and produce zero cross detection flags 25a, 25b at each detected zero cross. The projection engine 16 uses the zero cross detect signals 25a, 25b and/or the mirror sense signals 23a, 23b to synchronize projection for generating the beam control signals 26a, 26b so that the RGB laser apparatuses 17a, 17b properly modulate the RGB lasers 18a, 18b in coordination with the movement of the MEMS mirrors 11a, 11b such that the proper modulation for the RGB laser beams 18a, 18b is present at each spot of the targets over which the RGB laser beams 18a, 18b scan.

In some cases, it is desired for the movements of the MEMS mirrors 11a, 11b to be in phase with one another. In this case, as shown in the dual-projection system 10' of FIG. 3, the zero crosses detected by the zero cross detectors 15a, 15b are passed to the mirror controllers 14a, 14b. By determining the difference in time between the zero crosses of each MEMS mirror 11a, 11b, the mirror controllers 14a, 14b can adjust the phase of the drive control signals 24a, 24b they respectively produce (which in turn adjusts the phase of the drive signals 22a, 22b) until the zero crosses of the MEMS mirrors 11a, 11b occur simultaneously. Note that, due to the fact that the MEMS mirrors 11a, 11b will not have the same resonance frequency, the drive control signals 24a, 24b may end up being out of phase with each other in order to produce simultaneous zero crosses of the MEMS mirrors 11a, 11b.

It should be appreciated that as an alternative to the above, in some applications, only one of the mirror controllers 14a, 14b adjusts the phase of its respective drive control signals 24a, 24b based upon the difference in time between the zero crosses of the MEMS mirrors 11a, 11b detected by the zero cross detectors 15a, 15b, so that the zero crosses of the MEMS mirrors 11a, 11b occur simultaneously.

Regarding the effectuation of the phase changes of the drive control signals 24a, 24b, any suitable technique may be used to change the phase of the drive control signals 24a, 24b. For example, the mirror controllers 14a, 14b may use a digital delay to change the phase of the drive control signals 24a, 24b, or may change a counter value used in generating the drive control signals 24a, 24b.

Figure 4:
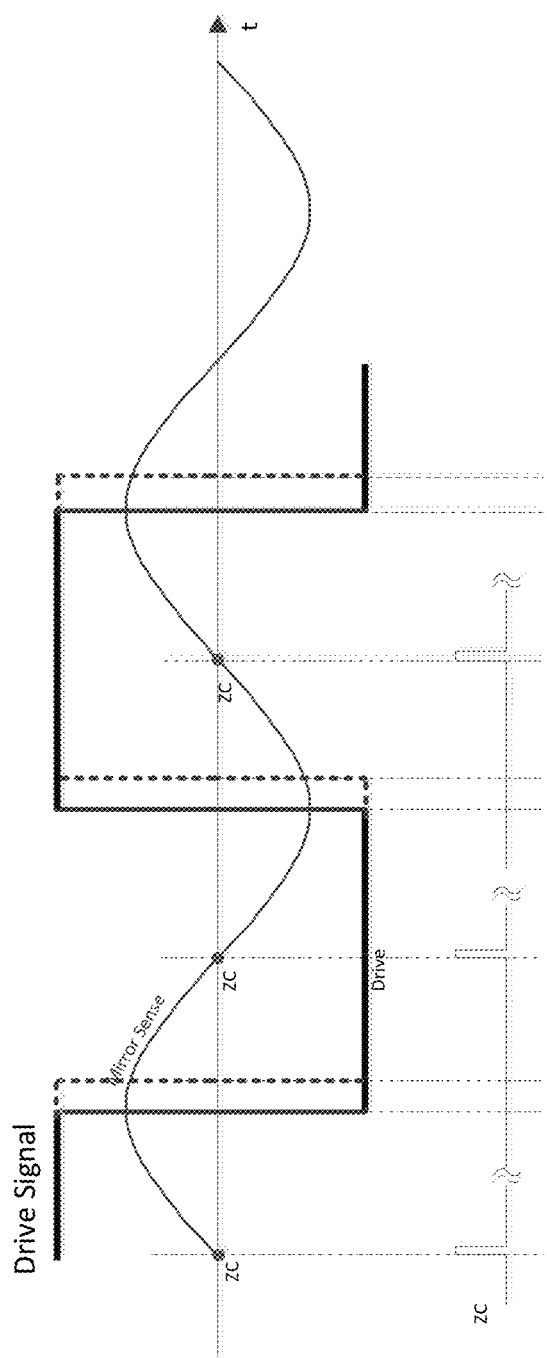
FIG. 4 is a graph showing adjustment of phase of a drive signal for a MEMS mirror, such as may be performed by the dual-projection system of FIG. 3.

The effect of this shift in the phase of a drive control signal on a drive signal can be seen in FIG. 4. Here, the previous waveform of the drive signal is shown in dashed lines, while the current waveform of the drive signal is shown in solid lines. It can be seen that phase of the previous waveform of the drive signal has been adjusted to produce the current waveform of the drive signal.

Other techniques usable for opening angle and/or maintenance of the drive signals 22a, 22b may be found at U.S. Pat. Pub. 2018/0356627, U.S. Pat. Pub. 2018/0348506, U.S. Pat. Pub. 2018/0321483, U.S. Pat. Pub. 2018/0067303, U.S. Pat. Pub. 2018/0024351, U.S. Pat. Pub. 2017/0307873, U.S. Pat. Pub. 2017/0131540, and U.S. patent Ser. No. 16/032,634, the contents of all of which are incorporated by reference. Those of skill in the art will understand how to adapt descriptions in these references of using opening angle control to maintain the mirrors at resonance to instead be to maintain the mirrors at the maximal opening angle possible for the frequency of the pre-drive signal used.

Figure 3:
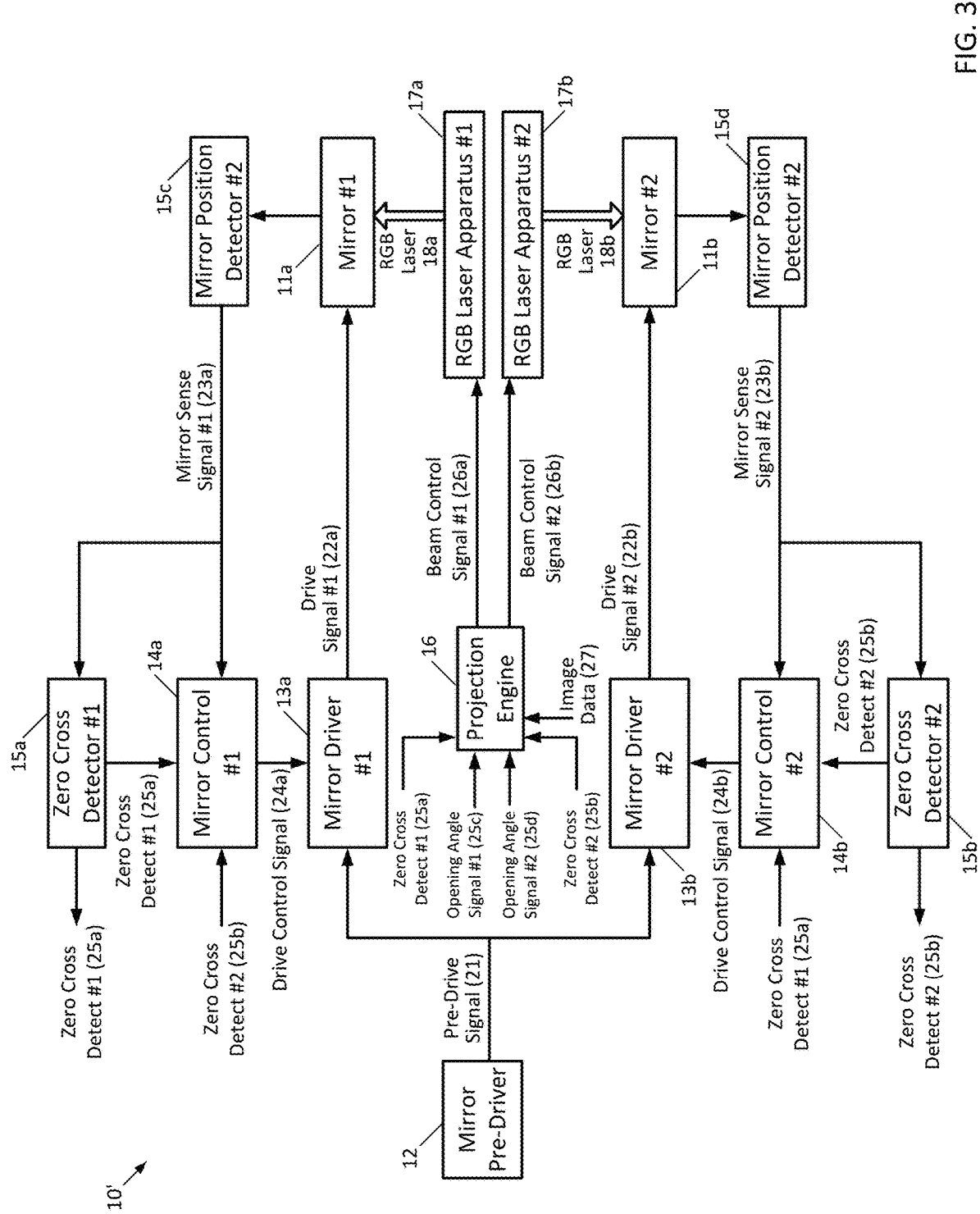
FIG. 3 is a block diagram of a second dual-projection system in accordance with this disclosure in which there are two mirrors operated at a same frequency.

Any suitable technique may be used to determine the resonance frequencies of the MEMS mirrors 11a, 11b of both FIG. 2 and FIG. 3. This can be performed as a production test. Alternatively, this can be performed in a calibration phase of operation in which the mirror drivers 13a, 13b perform a frequency sweep of the drive signals 22a, 22b while the opening angles of the MEMS mirrors 11a, 11b are monitors. The frequency of the drive signals 22a, 22b at which each MEMS mirror 11a, 11b is at its maximum opening angle is the resonance frequency for that MEMS mirror.

It should be understood that the above circuits and techniques are not limited to the control of two MEMS mirrors but instead may be applied to any number of MEMS mirrors, with the pre-drive signal being an average of the resonance frequencies of all MEMS mirrors that it is desired to control.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A projector, comprising:
   a first microelectromechanical (MEMS) mirror;
   a second MEMS mirror;
   a mirror pre-driver configured to generate a pre-drive signal, the pre-drive signal having a frequency that is a frequency at which an opening angle of the first MEMS mirror is equal to an opening angle of the second MEMS mirror, wherein the frequency of the pre-drive signal is neither a resonance frequency of the first MEMS mirror nor a resonance frequency of the second MEMS mirror;
   a first mirror control circuit configured to generate a first drive control signal from the pre-drive signal for the first MEMS mirror;
   a first mirror driver configured to generate a first drive signal for the first MEMS mirror from the first drive control signal;
   a second mirror control circuit configured to generate a second drive control signal from the pre-drive signal for the second MEMS mirror; and
   a second mirror driver configured to generate a second drive signal for the second MEMS mirror from the second drive control signal;
   wherein the first and second drive control signals are generated by the first and second mirror control circuits so that the first and second drive signals each have a same frequency as the pre-drive signal but each have a different amplitude and phase from one another so as to cause the first and second MEMS mirrors to move at a same frequency, with a same and substantially constant given opening angle, and in phase with one another.

2. The projector of claim 1, wherein the frequency at which the opening angle of the first MEMS mirror is equal to the opening angle of the second MEMS mirror is an average of a resonance frequency of the first MEMS mirror and a resonance frequency of the second MEMS mirror.

3. The projector of claim 1, wherein the first and second mirror control circuits generate the first and second drive control signals so that the first and second drive signals are different in amplitude and phase from one another.

4. The projector of claim 1, further comprising a red-green-blue (RGB) laser source configured to project RGB laser beams that impinge upon the first and second MEMS mirrors; and further comprising a VR headset housing having the RGB laser source, the first and second MEMS mirrors, mirror pre-driver, first and second mirror control circuits, and first and second mirror drivers therein.

5. The projector of claim 1,
further comprising a first mirror position sensor associated with the first MEMS mirror and a second mirror position sensor associated with the second MEMS mirror;
further comprising a first zero cross detector associated with the first mirror position sensor and a second zero cross detector associated with the second mirror position sensor;
wherein the first and second mirror position sensors are configured to generate first and second mirror sense signals indicating peak opening angles of the first and second MEMS mirrors;
wherein the first mirror control circuit generates the first drive control signal as a function of the pre-drive signal, the first mirror sense signal, and detected zero crosses of a first mirror sense signal generated by the first MEMS mirror in response to the first drive signal; and
wherein second mirror control circuit generates the second drive control signal as a function of the pre-drive signal, the second mirror sense signal, and detected zero crosses of a second mirror sense signal generated by the second MEMS mirror in response to the second drive signal.

6. A projector, comprising:
a first microelectromechanical (MEMS) mirror;
a second MEMS mirror;
a mirror pre-driver configured to generate a pre-drive signal, the pre-drive signal having a frequency that is a frequency at which an opening angle of the first MEMS mirror is equal to an opening angle of the second MEMS mirror, wherein the frequency of the pre-drive signal is neither a resonance frequency of the first MEMS mirror nor a resonance frequency of the second MEMS mirror;
a first mirror control circuit configured to generate a first drive control signal from the pre-drive signal for the first MEMS mirror;
a first mirror driver configured to generate a first drive signal for the first MEMS mirror from the first drive control signal;
a second mirror control circuit configured to generate a second drive control signal from the pre-drive signal for the second MEMS mirror; and
a second mirror driver configured to generate a second drive signal for the second MEMS mirror from the second drive control signal;
wherein the first and second drive control signals are generated by the first and second mirror control circuits so as to cause the first and second MEMS mirrors to move at a same frequency, with a same and substantially constant given opening angle.

7. The projector of claim 6, wherein the frequency at which the opening angle of the first MEMS mirror is equal to the opening angle of the second MEMS mirror is an average of a resonance frequency of the first MEMS mirror and a resonance frequency of the second MEMS mirror.

8. The projector of claim 6, wherein the first and second mirror control circuits generate the first and second drive control signals so that the first and second drive signals are different in amplitude from one another.

9. The projector of claim 6, further comprising a red-green-blue (RGB) laser source configured to project RGB laser beams that impinge upon the first and second MEMS mirrors; and further comprising a VR headset housing having the RGB laser source, the first and second MEMS mirrors, mirror pre-driver, first and second mirror control circuits, and first and second mirror drivers therein.

10. The projector of claim 6,
further comprising a first mirror position sensor associated with the first MEMS mirror and a second mirror position sensor associated with the second MEMS mirror;
wherein the first and second mirror position sensors are configured to generate first and second mirror sense signals indicating peak opening angles of the first and second MEMS mirrors;
wherein the first mirror control circuit generates the first drive control signal as a function of the pre-drive signal and the first mirror sense signal; and
wherein the second mirror control circuit generates the second drive control signal as a function of the pre-drive signal and the second mirror sense signal.

11. A control circuit for driving first and second movable mirrors, the control circuit comprising:
a mirror pre-driver configured to generate a pre-drive signal, the pre-drive signal having a frequency that is that is a frequency at which an opening angle of the first movable mirror is equal to an opening angle of the second movable mirror;
a first mirror control circuit configured to generate a first drive control signal from the pre-drive signal for the first movable mirror in response to an operating characteristic of the first movable mirror;
a first mirror driver configured to generate a first drive signal for the first movable mirror from the first drive control signal;
a second mirror control circuit configured to generate a second drive control signal from the pre-drive signal for the second movable mirror in response to an operating characteristic of the second movable mirror; and
a second mirror driver configured to generate a second drive signal for the second movable mirror from the second drive control signal;
wherein the first and second drive control signals are generated by the first and second mirror control circuits so that the first and second drive signals each have a same frequency as the pre-drive signal but are different in amplitude from one another so as to cause the first and second movable mirrors to move at a same frequency, with a same and substantially constant given opening angle as one another.

12. The control circuit of claim 11, wherein the frequency at which the opening angle of the first movable mirror is equal to the opening angle of the second movable mirror is an average of a resonance frequency of the first movable mirror and a resonance frequency of the second movable mirror.

13. The control circuit of claim 11,
wherein the operating characteristic of the first movable mirror comprises zero crosses of a first mirror sense signal generated by the first movable mirror in response to the first drive signal;
wherein the operating characteristic of the second movable mirror comprises zero crosses of a second mirror sense signal generated by the second movable mirror in response to the second drive signal; and wherein the first and second drive control signals are generated by the first and second mirror control circuits so that the first and second drive signals are different in phase from one another so as to cause the first and second movable mirrors to move in phase with one another.

14. The control circuit of claim 11, wherein the operating characteristic of the first movable mirror comprises a maximum opening angle reached by the first movable mirror;

wherein the operating characteristic of the second movable mirror comprises a maximum opening angle reached by the second movable mirror; and wherein the first and second drive control signals are generated by the first and second mirror control circuits so that the first and second drive signals are different in amplitude from one another so as to cause the first and second movable mirrors to move with a same and substantially constant given opening angle as one another.

15. A method of driving first and second movable mirrors, comprising:

generating a pre-drive signal having a frequency that is a frequency at which an opening angle of the first movable mirror is equal to an opening angle of the second movable mirror;

generating a first drive control signal from the pre-drive signal for the first movable mirror in response to an operating characteristic of the first movable mirror;

generating a first drive signal for the first movable mirror from the first drive control signal;

generating a second drive control signal from the pre-drive signal for the second movable mirror in response to an operating characteristic of the second movable mirror; and generating a second drive signal for the second movable mirror from the second drive control signal;

wherein the first and second drive signals are generated so as to cause the first and second movable mirrors to move at a same frequency, and with a same and substantially constant given opening angle as one another.

16. The method of claim 15, wherein the frequency at which the opening angle of the first movable mirror is equal to the opening angle of the second movable mirror is an average of a resonance frequency of the first movable mirror and a resonance frequency of the second movable mirror.

17. The method of claim 15, wherein the first and second drive signals are generated to each have a same frequency as the pre-drive signal but be different in amplitude from one another.

18. The method of claim 15, wherein the first and second drive signals are generated to each have a same frequency as the pre-drive signal but be different in amplitude and phase from one another.

19. The method of claim 15, further comprising, prior to generating the pre-drive signal:

performing a frequency sweep on a drive signal applied to the first movable mirror while monitoring opening angle of the first movable mirror, and determining a resonance frequency of the first movable mirror to be a frequency of the frequency sweep at which the opening angle of the first movable mirror is at a maximum;

performing a frequency sweep on a drive signal applied to the second movable mirror while monitoring opening angle of the second movable mirror, and determining a resonance frequency of the second movable mirror to be a frequency of the frequency sweep at which the opening angle of the second movable mirror is at a maximum; and calculating an average of the resonance frequency of the first movable mirror and a resonance frequency of the second movable mirror.

20. The method of claim 15, further comprising generating RGB lasers and directing the RGB lasers to impinge upon the first and second movable mirrors.

21. A method of driving first and second MEMS movable mirrors, having respective opening angles, the method comprising:

generating a pre-drive signal having a frequency that is a frequency at which an opening angle of the first movable mirror is equal to an opening angle of the second MEMS mirror, wherein the frequency of the pre-drive signal is neither a resonance frequency of the first MEMS mirror nor a resonance frequency of the second MEMS mirror;

generating a first drive control signal from the pre-drive signal for the first movable mirror;

generating a first drive signal for the first movable mirror from the first drive control signal;

generating a second drive control signal from the pre-drive signal for the second movable mirror; and generating a second drive signal for the second movable mirror from the second drive control signal;

wherein the first and second drive signals are generated so as to cause the first and second movable mirrors to move at a same frequency, with a same and substantially constant given opening angle, and the first and second drive signals are generated to each have a same frequency as the pre-drive signal but be different in amplitude and phase from one another;

generating, via mirror position sensors respectively associated with the MEMS mirrors, mirror sense signals indicating the current opening angles of the MEMS mirrors, with zero cross detectors respectively receiving the mirror sense signals, detecting zero crosses of the mirror sense signals and producing zero cross detection flags at each detected zero cross; and generating, via mirror controllers said drive control signals for mirror drivers that cause the mirror drivers to adjust the amplitudes of the drive signals separately from one another, with the aim of ensuring that the MEMS mirrors maintain constant and equal opening angles, said mirror controllers determining the difference in time between the zero crosses of each MEMS mirror and adjusting the phase of the drive control signals they respectively produce, which in turn adjusts the phase of the drive signals until the zero crosses of the MEMS mirrors occur simultaneously.

22. The method of claim 21, further comprising, prior to generating the predrive signal:

performing a frequency sweep on a drive signal applied to the first movable mirror while monitoring opening angle of the first movable mirror, and determining the resonance frequency of the first movable mirror to be a frequency of the frequency sweep at which the opening angle of the first movable mirror is at a maximum;

performing a frequency sweep on a drive signal applied to the second movable mirror while monitoring opening angle of the second movable mirror, and determining the resonance frequency of the second movable mirror to be a frequency of the frequency sweep at which the opening angle of the second movable mirror is at a maximum; and calculating the frequency at which the opening angle of the first MEMS mirror is equal to the opening angle of the second MEMS mirror as an average of the resonance frequency of the first movable mirror and the resonance frequency of the second movable mirror.

23. The method of claim 21, further comprising generating RGB lasers and directing the RGB lasers to impinge upon the first and second movable mirrors.

24. The method of claim 21, wherein the pre-drive signal has a frequency equal to the meeting point of the gain transfer function of the MEMS mirror and the MEMS mirror.

* * * * *